US011117269B2

(12) United States Patent
Inoue et al.

(10) Patent No.: US 11,117,269 B2
(45) Date of Patent: Sep. 14, 2021

(54) ROBOT

(71) Applicant: FANUC CORPORATION, Yamanashi (JP)

(72) Inventors: Toshihiko Inoue, Yamanashi (JP); Toshikatsu Kuroki, Yamanashi (JP); Naoki Fujioka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 299 days.

(21) Appl. No.: 16/361,726

(22) Filed: Mar. 22, 2019

(65) Prior Publication Data
US 2019/0321988 A1  Oct. 24, 2019

(30) Foreign Application Priority Data

Apr. 20, 2018 (JP) .............................. JP2018-081452

(51) Int. Cl.
*B25J 19/00* (2006.01)
*H02G 3/04* (2006.01)
*B25J 9/00* (2006.01)

(52) U.S. Cl.
CPC ......... *B25J 19/0041* (2013.01); *B25J 9/0009* (2013.01); *H02G 3/04* (2013.01)

(58) Field of Classification Search
CPC . B25J 19/0041; B25J 19/0025; B25J 19/0029
See application file for complete search history.

(56) References Cited

U.S. PATENT DOCUMENTS 4,705,243 A * 11/1987 Hartmann ............ B23K 11/362
                                                        248/160
5,136,196 A *  8/1992 Schmidt .................... B25J 5/00
                                                        310/12.19
(Continued)

FOREIGN PATENT DOCUMENTS

EP        0 891 842 A1     1/1999
EP        1 145 808 A2    10/2001
(Continued)

OTHER PUBLICATIONS

Japanese Office Action dated Jun. 16, 2020, in connection with corresponding JP Application No. 2018-081452 (7 pp., including machine-generated English translation).

(Continued)

*Primary Examiner* — William Kelleher
*Assistant Examiner* — Gregory T Prather
(74) *Attorney, Agent, or Firm* — Maier & Maier, PLLC

(57) ABSTRACT

Provided is a robot including: a base; and a movable portion including a rotating drum that rotates about a vertical axis with respect to the base. The base is provided with an opening portion through which wire members are led into the base; the base and the rotating drum are provided with a hollow portion in which the wire members are guided into the rotating drum; the robot further includes a distribution board member that is detachably attached to the base; the distribution board member is provided with an attachment portion that is attached to the base, and a relay portion that is disposed on the outside of the opening portion with a gap therebetween; and the relay portion includes a mountable region in which a connector that relays some of the wire members is mounted.

9 Claims, 5 Drawing Sheets

(56) References Cited

U.S. PATENT DOCUMENTS

| | | | |
|---|---|---|---|
| 5,205,701 A * | 4/1993 | Kigami | B25J 9/0009 |
| | | | 285/305 |
| 5,437,207 A * | 8/1995 | Zimmer | B23K 11/318 |
| | | | 414/918 |
| 6,250,174 B1 | 6/2001 | Terada et al. | |
| 2004/0261563 A1 * | 12/2004 | Inoue | B25J 19/0025 |
| | | | 74/490.03 |
| 2009/0114052 A1 | 5/2009 | Haniya et al. | |
| 2010/0246269 A1 | 9/2010 | Kan et al. | |
| 2011/0107611 A1 * | 5/2011 | Desforges | G01B 7/008 |
| | | | 33/502 |
| 2011/0107612 A1 | 5/2011 | Ferrari et al. | |
| 2011/0107613 A1 | 5/2011 | Tait | |
| 2011/0107614 A1 | 5/2011 | Champ | |
| 2011/0112786 A1 | 5/2011 | Desforges et al. | |
| 2011/0219906 A1 | 9/2011 | Haniya et al. | |
| 2012/0012919 A1 | 1/2012 | Kan et al. | |
| 2012/0066923 A1 | 3/2012 | Desforges et al. | |
| 2012/0090185 A1 | 4/2012 | Champ | |
| 2012/0144684 A1 | 6/2012 | Ferrari et al. | |
| 2012/0222323 A1 | 9/2012 | Tait | |
| 2013/0239424 A1 | 9/2013 | Tait | |
| 2014/0020255 A1 | 1/2014 | Ferrari et al. | |
| 2014/0137685 A1 * | 5/2014 | Iwayama | B25J 18/00 |
| | | | 74/490.02 |
| 2014/0169104 A1 | 6/2014 | Kan et al. | |
| 2014/0230261 A1 | 8/2014 | Tait | |
| 2014/0290081 A1 | 10/2014 | Desforges et al. | |
| 2014/0290415 A1 * | 10/2014 | Hasuo | B25J 19/0025 |
| | | | 74/490.02 |
| 2014/0358279 A1 | 12/2014 | Kimoto | |
| 2015/0153146 A1 | 6/2015 | Ferrari et al. | |
| 2015/0231781 A1 * | 8/2015 | Ochiishi | H02G 11/006 |
| | | | 414/749.1 |
| 2016/0221184 A1 * | 8/2016 | Sueyoshi | B25J 9/047 |
| 2016/0298949 A1 | 10/2016 | Tait | |
| 2016/0363430 A1 | 12/2016 | Desforges et al. | |
| 2017/0028568 A1 | 2/2017 | Sekine et al. | |
| 2017/0239810 A1 * | 8/2017 | Bordegnoni | B25J 9/0009 |
| 2017/0268861 A1 | 9/2017 | Tait | |
| 2017/0282381 A1 | 10/2017 | Inoue et al. | |
| 2017/0291313 A1 * | 10/2017 | Inoue | B25J 17/00 |
| 2018/0319022 A1 * | 11/2018 | Yoshimura | B25J 9/0009 |
| 2018/0333844 A1 * | 11/2018 | Inoue | B23K 9/12 |
| 2018/0372469 A1 | 12/2018 | Desforges et al. | |
| 2019/0001483 A1 * | 1/2019 | Ishizu | B25J 19/0075 |
| 2019/0022851 A1 * | 1/2019 | Konno | B25J 11/0075 |
| 2019/0061177 A1 * | 2/2019 | Lamb | B25J 18/04 |
| 2019/0099903 A1 * | 4/2019 | Goto | G08B 5/36 |
| 2019/0118316 A1 * | 4/2019 | Takahara | B25J 19/0075 |
| 2019/0134809 A1 * | 5/2019 | Owa | B25J 17/02 |
| 2019/0299427 A1 * | 10/2019 | Nakayama | H02G 3/0456 |
| 2019/0329428 A1 * | 10/2019 | Sakurai | B25J 18/00 |
| 2020/0009722 A1 * | 1/2020 | Yamashiro | B25J 9/06 |
| 2020/0038985 A1 * | 2/2020 | Inoue | B25J 11/005 |
| 2020/0124395 A1 | 4/2020 | Desforges et al. | |
| 2020/0290197 A1 * | 9/2020 | Inoue | B25J 9/0009 |
| 2020/0290212 A1 * | 9/2020 | Fujioka | B25J 19/0029 |

FOREIGN PATENT DOCUMENTS

| | | |
|---|---|---|
| EP | 1 930 129 A1 | 6/2008 |
| EP | 2 113 343 A2 | 11/2009 |
| EP | 2 851 758 A1 | 3/2015 |
| JP | H02-095592 A | 4/1990 |
| JP | H05-138581 A | 6/1993 |
| JP | H08-281577 A | 10/1996 |
| JP | H10-175188 A | 6/1998 |
| JP | 2004-136371 A | 5/2004 |
| JP | 2007-044767 A | 2/2007 |
| JP | 2012-056082 A | 3/2012 |
| JP | 2013-510320 A | 3/2013 |
| JP | 2014-069270 A | 4/2014 |
| JP | 2014-198351 A | 10/2014 |
| JP | 2014-233763 A | 12/2014 |
| JP | 2017-024143 A | 2/2017 |
| JP | 2017-185580 A | 10/2017 |
| WO | 2011/057130 A2 | 5/2011 |

OTHER PUBLICATIONS

Japanese Search Report dated Jun. 9, 2020, in connection with corresponding JP Application No. 2018-081452 (27 pp., including machine-generated English translation).

* cited by examiner

ROBOT

CROSS-REFERENCE TO RELATED APPLICATIONS

This application is based on Japanese Patent Application No. 2018-081452, the contents of which are incorporated herein by reference.

FIELD

The present invention relates to a robot.

BACKGROUND

In the related art, there is a known robot provided with: a base that is installed on the floor; and a movable portion including a rotating drum that is supported so as to be rotatable about a vertical axis with respect to the base (for example, see Japanese Unexamined Patent Application, Publication No. 2017-185580).

In the robot in Japanese Unexamined Patent Application, Publication No. 2017-185580, the rotating drum is provided with, around the vertical axis, a hollow portion that connects a space inside the base to an internal space of the rotating drum. By leading wire members, which have been led into the base from the outside of the base, into the rotating drum through the hollow portion, it is possible to prevent a large load from being applied to the wire members when the rotating drum rotates with respect to the base.

SUMMARY

An aspect of the present invention is a robot including: a base that is installed on the floor; and a movable portion including a rotating drum that is supported so as to be rotatable about a vertical axis with respect to the base, wherein the base is provided with an opening portion through which wire members are led into the base from the outside thereof, wherein the base and the rotating drum are provided with, at a position including the axis, a hollow portion in which the wire members that have been led into the base are guided into the rotating drum along the axis, wherein the robot further comprises a distribution board member that is detachably attached to the base, in the vicinity of the opening portion, wherein the distribution board member is provided with an attachment portion that is attached to the base, and a relay portion that is disposed on the outside of the opening portion with a gap therebetween when the attachment portion is attached to the base, and wherein the relay portion includes a mountable region having a larger area than the opening portion and in which a connector that relays at least some of the wire members can be mounted.

DETAILED DESCRIPTION

A robot 1 according to an embodiment of the present invention will be described below with reference to the drawings.

Figure 1:
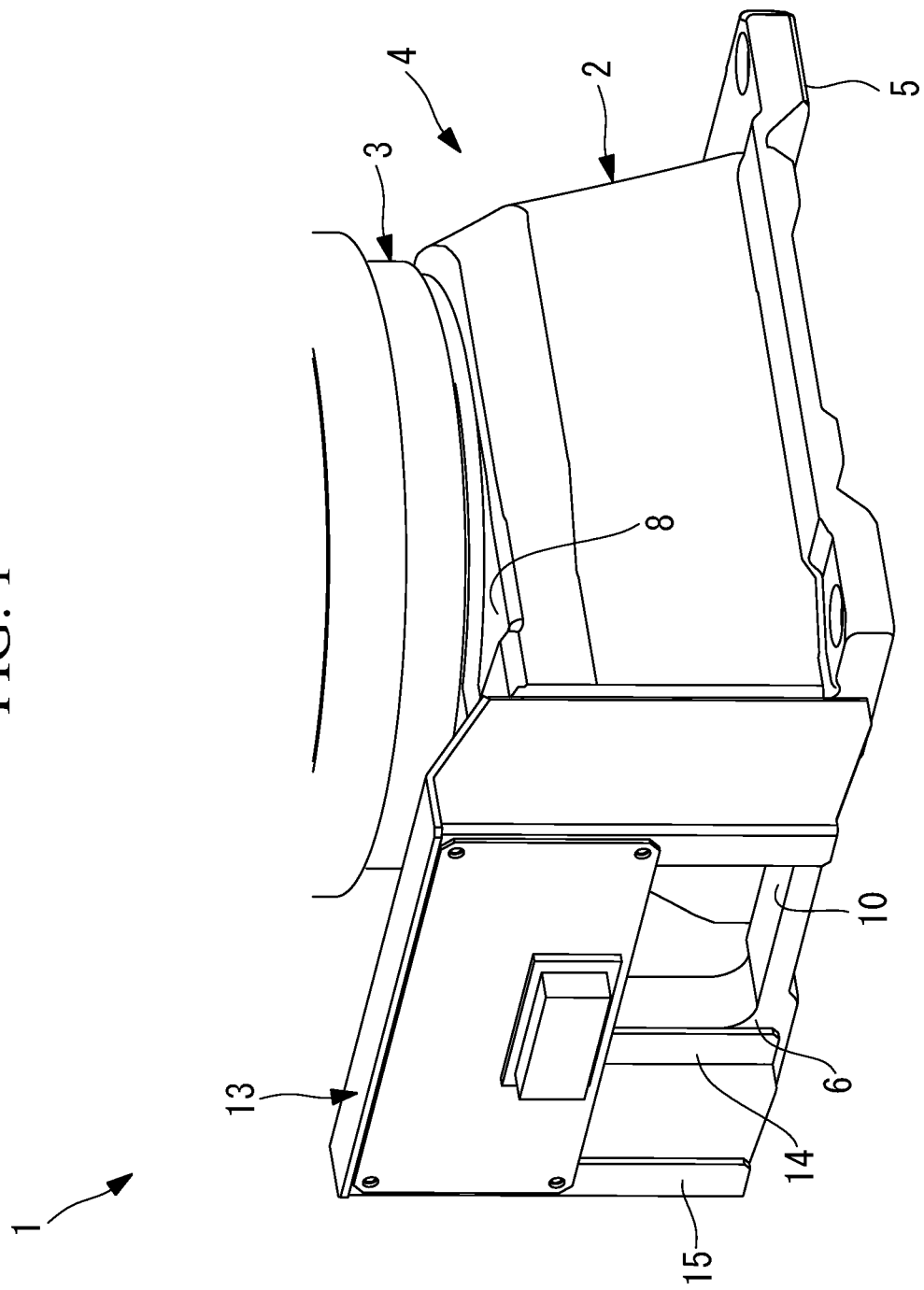
FIG. 1 is a partial perspective view showing a robot according to an embodiment of the present invention.

The robot 1 according to this embodiment is, for example, a 6-axis articulated robot and, as shown in FIG. 1, is provided with: a base 2 that is installed on the floor; and a movable portion 4 including a rotating drum 3 that rotates about a vertical axis (axis) with respect to the base 2.

The base 2 is formed in a box shape provided with: a bottom surface 5 for installing the robot 1 on the floor; side walls 6 that rise from the bottom surface 5 in the vertical direction; and a top plate 8 provided with a central hole 7 at a position including the vertical axis. The side wall 6 that is disposed in a direction corresponding to a back surface of the robot 1 is provided with an opening portion 10 that penetrates through the base 2 and that is for leading wire members 9 into the base 2 from the outside thereof.

Figure 2:
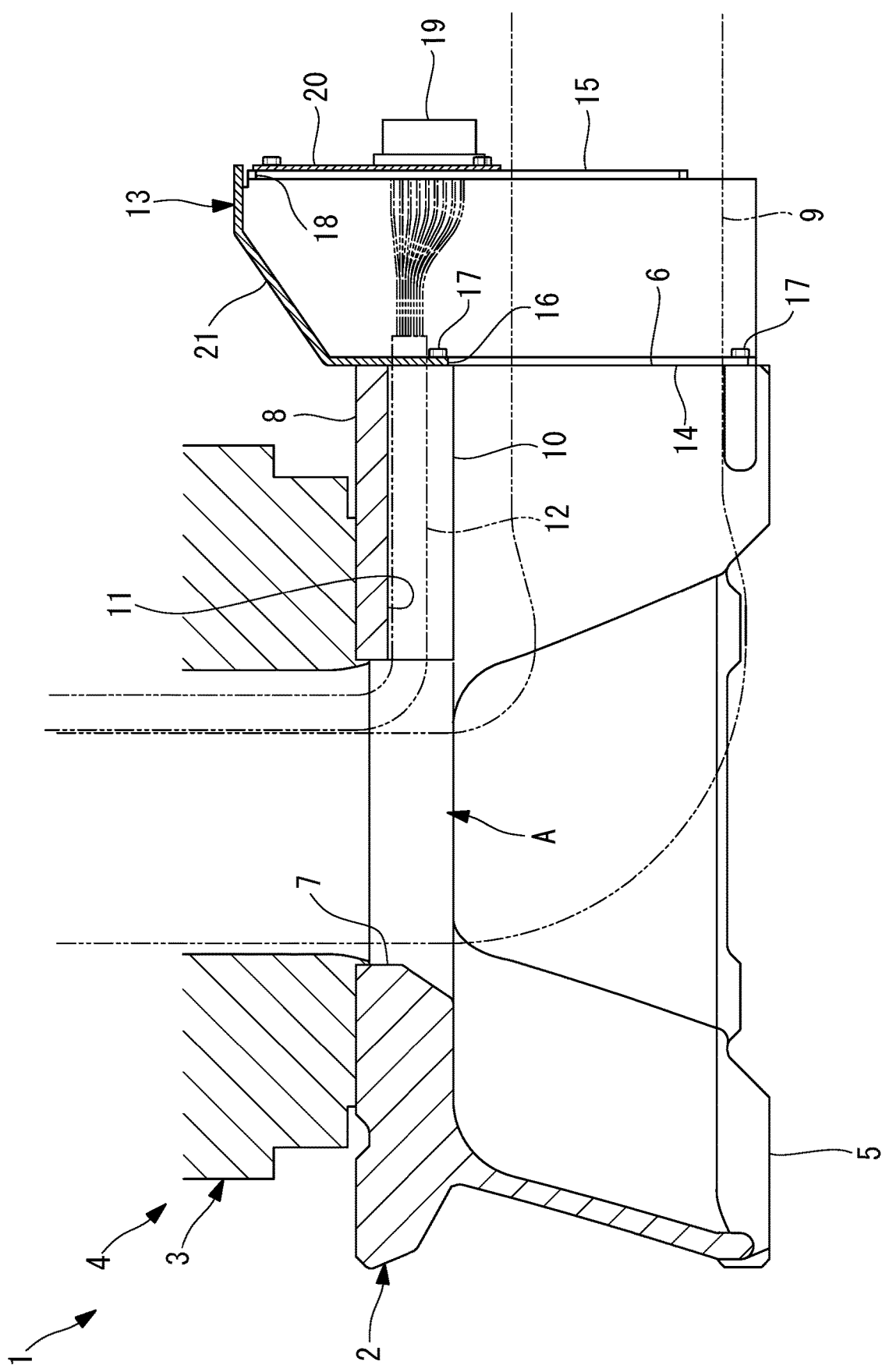
FIG. 2 is a longitudinal cross-sectional view showing a base and a distribution board member of the robot in FIG. 1.

The rotating drum 3 is also provided with a through-hole (not shown) that penetrates therethrough in the vertical direction, at a position corresponding to the central hole 7 of the top plate 8 of the base 2, and as shown in FIG. 2, the central hole 7 of the base 2 and the through-hole of the rotating drum 3 form a hollow portion A that connects an internal space of the base 2 and an internal space of the rotating drum 3 in a region including the vertical axis.

The wire members 9 that have been led into the base 2 from the outside thereof through the opening portion 10 rise through the hollow portion A in the vertical direction and are guided into the rotating drum 3 from inside the base 2. Because the hollow portion A is formed in a region including an axis of rotation of the rotating drum 3 with respect to the base 2, the wire members 9 rising through the hollow portion A in the vertical direction are not subjected to a large load even when the rotating drum 3 rotates with respect to the base 2.

Figure 3:
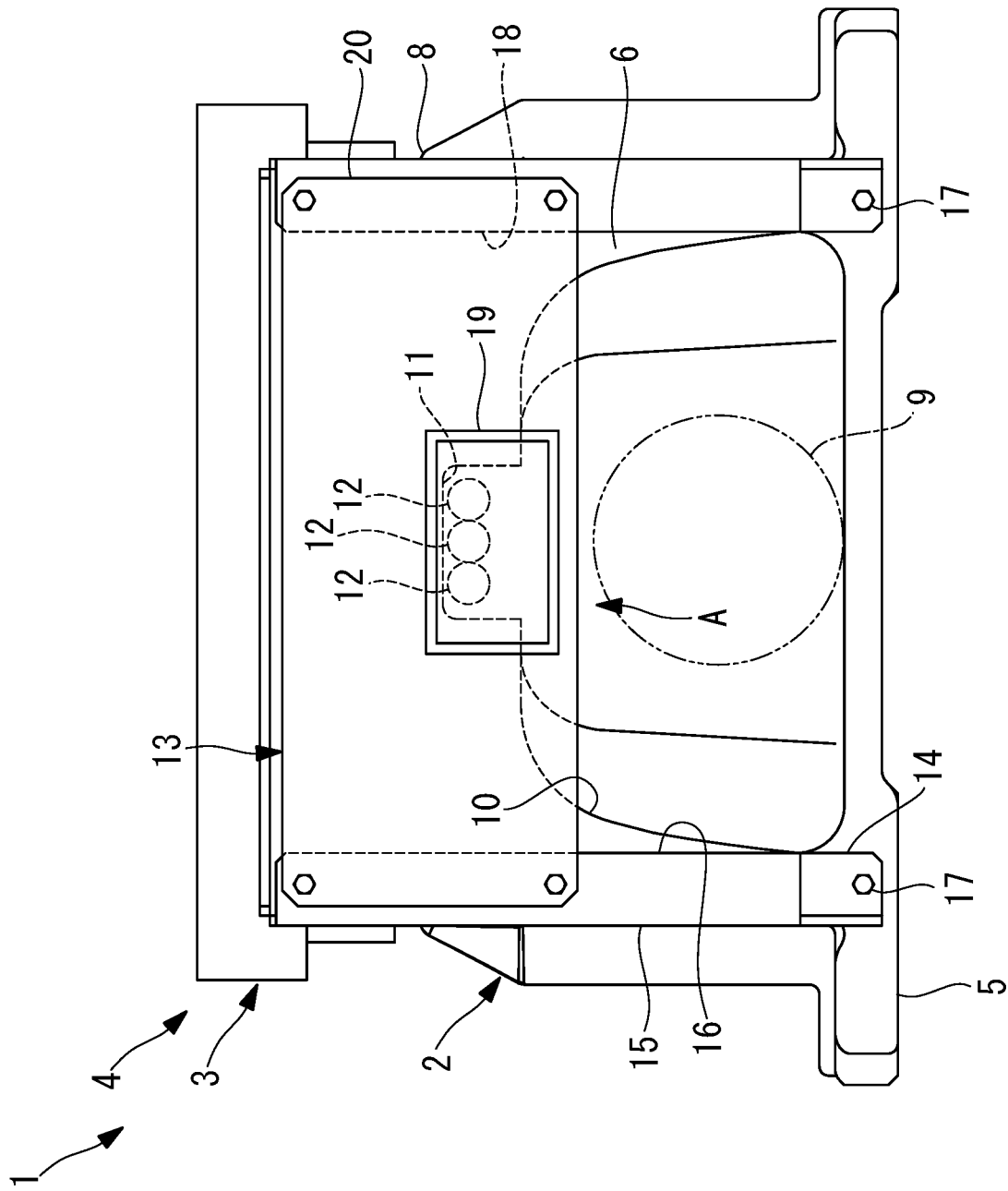
FIG. 3 is a side view showing the relationship between an opening portion provided in the base and the distribution board member of the robot in FIG. 1.
Figure 4:
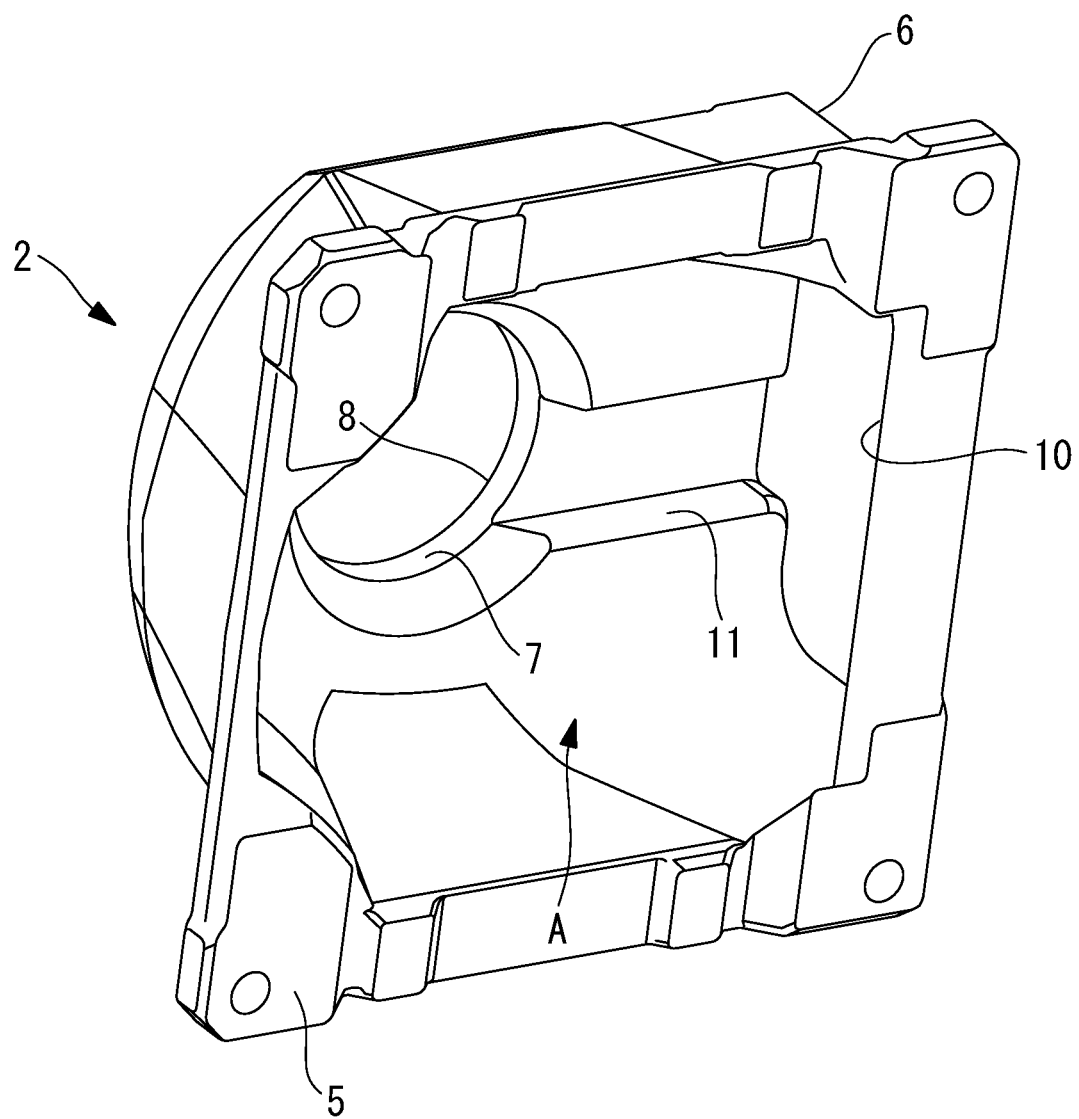
FIG. 4 is a perspective view showing a groove formed on an inner surface of the base in FIG. 2.

As shown in FIGS. 2 to 4, a groove 11 that connects the opening portion 10 and the central hole 7 is provided on a lower surface of the top plate 8 of the base 2. As shown in FIG. 3, the groove 11 is formed in a shape from which a portion of an upper edge of the opening portion 10 is cut out, and has a size capable of accommodating wire members 12 which are different from the wire members 9.

As shown in FIG. 1, the robot 1 according to this embodiment is provided with a distribution board member 13 that is detachably attached in the vicinity of the opening portion 10 of the base 2. The distribution board member 13 is formed in a box shape by using sheet metal.

As shown in FIG. 2, the distribution board member 13 is provided with: an attachment surface (attachment portion) 14 that is attached to the side wall 6 in which the opening portion 10 is formed; and a relay surface (relay portion) 15 that is disposed so as to be parallel to the attachment surface 14 with a space therebetween.

As shown in FIG. 3, the attachment surface 14 is provided with: an opening 16 that has substantially the same size and shape as the opening portion 10 of the base 2; and a plurality of attachment holes that are provided in the periphery of the opening 16. The distribution board member 13 is detachably attached to the side wall 6 of the base 2 by aligning the attachment holes of the attachment surface 14 with tap holes provided in the side wall 6 of the base 2 and screwing bolts 17 penetrating through the attachment holes into the tap holes. In a state in which the attachment surface 14 is fixed to the side wall 6 of the base 2, the opening 16 of the attachment surface 14 and the opening portion 10 of the base 2 substantially coincide with each other. With this configuration, the attachment surface 14 has a form in which the attachment surface 14 does not significantly reduce the opening area of the opening portion 10 when attached to the side wall 6 of the base 2.

As shown in FIGS. 1 and 2, the relay surface 15 is provided with: an opening (mountable region) 18; and a plurality of tap holes that are provided in the periphery of the opening 18. In addition, a plate 20 to which a connector 19 is attached is fixed at a position where a portion of the opening 18 of the relay surface 15 is closed. The opening (penetration opening) 18 excluding the region closed by the plate 20 is in an open state. By utilizing the opening 18 in this open region, it is possible to lead the wire members 9, which are not relayed by the connector 19, into the base 2 from the outside thereof.

As shown in FIG. 3, the opening 18 of the relay surface 15 has a form in which the opening 18 expands upward in the vertical direction with respect to the opening 16 of the attachment surface 14. In addition, as shown in FIG. 2, the attachment surface 14 and the relay surface 15 are connected in the distribution board member 13 by means of an inclined surface 21 rising from the attachment surface 14 toward the relay surface 15.

The operation of the thus-configured robot 1 according to this embodiment will be described below.

With the robot 1 according to this embodiment, the wire members 12 that connect a control device and the robot 1 are relayed by the connector 19 fixed to the plate 20 of the relay surface 15. On the inner side of the relay surface 15, the wire members 12 connected to the connector 19 are guided to the central hole 7 of the base 2 via the groove 11 which is formed by cutting out the upper edge of the opening portion 10 of the base 2, are subsequently guided into the rotating drum 3 through the hollow portion A formed in the base 2 and the rotating drum 3, and are connected to motors for respective shafts of the movable portion 4, the motors being disposed above the rotating drum 3.

The one or more wire members 9 to be connected to a tool attached at the distal end of the robot 1, in a state in which the wire members 9 are bundled in a flexible conduit, pass through the open portion of the opening 18 of the relay surface 15 and are led into the base 2 from the outside thereof without being relayed at the relay surface 15. Then, the wire members 9 pass through the hollow portion A by being bent in the vertical direction in the base 2, are guided into the rotating drum 3, and are connected to the tool at the distal end via the movable portion 4.

As described above, because the wire members 9, 12 are guided into the rotating drum 3 from inside the base 2 through the hollow portion A formed in the region including the vertical axis, which is a rotation axis of the rotating drum 3, even when the rotating drum 3 rotates with respect to the base 2, only a moderate torsional moment acts on the individual wire members 9, 12 and a large load is not applied thereto. As a result, the wire members 9, 12 are maintained in a durable and sound state.

In a case in which there is a wire member 12 to be relayed by the connector 19, the external dimension of the connector 19 becomes larger than the external dimension of the cross section of the wire member 12. Therefore, if the opening portion 10 for introducing the wire member 12 into the base 2 is made smaller, it is possible to make the wire member 12 pass therethrough, but it becomes difficult to mount the connector 19 at the opening portion 10.

In this embodiment, the box-shaped distribution board member 13 is attached to the side wall 6 in which the opening portion 10 of the base 2 is provided, and the relay surface 15 that includes the opening 18 having a larger area than the opening 16 of the attachment surface 14 is provided on the outside of the attachment surface 14 attached to the base 2; thus, even if the opening portion 10 of the side wall 6 of the base 2 is made smaller, it is possible to secure a space in which the connector 19 for relaying the wire members 12 can be mounted.

In other words, although the area of the opening portion 10 becomes smaller if the height of the top plate 8 of the base 2 is reduced to reduce the total height of the robot 1, by disposing, on the outside of the opening portion 10, the relay surface 15 that expands upward in the vertical direction with respect to the opening portion 10, it is possible to secure a space in which the connector 19 for relaying the wire members 12 can be mounted. As a result, there are advantages in that: it is possible to achieve size reduction by reducing the total height of the robot 1 without changing the motion range of the movable portion 4; and it is also possible to secure a space in which the connector 19 that relays at least some of the wire members 12 can be mounted.

In this embodiment, because the plate 20 to which the connector 19 is attached is fixed to the upper section of the relay surface 15, it is possible to keep the lower section of the relay surface 15 widely open. By doing so, there is an advantage in that it is possible to secure a large space for introducing the wire members 9 that are not relayed by the connector 19 into the base 2 from the outside thereof.

Because the wire members 12 for driving the respective shafts of the robot 1 are accommodated in the groove 11 formed on the lower surface of the top plate 8 of the base 2, it is possible to reduce interference with the wire members 9 that are introduced into the base 2 from the outside thereof without being relayed by the connector 19. In other words, there are many cases in which a user attaches the wire members 12 for a tool, which are not relayed by the connector 19, and because the wire members 9 that are required for driving the robot 1 do not hinder the attachment work, it is possible to facilitate the attachment work. On the other hand, there is an advantage in that it is possible to protect the wire members 9 that are required for driving the robot 1 from the wire members 12 that are attached afterwards.

In this embodiment, the distribution board member 13 projects above the upper surface of the base 2 to form the opening 18 of the relay surface 15 so as to be larger than the opening portion 10; however, the distribution board member 13 is provided with the inclined surface 21 rising from the attachment surface 14 toward the relay surface 15, thereby reducing the upward projection amount of the distribution board member 13 at the position close to the rotating drum 3. By doing so, it is possible to secure a large space in the periphery of the rotating drum 3.

Figure 5:
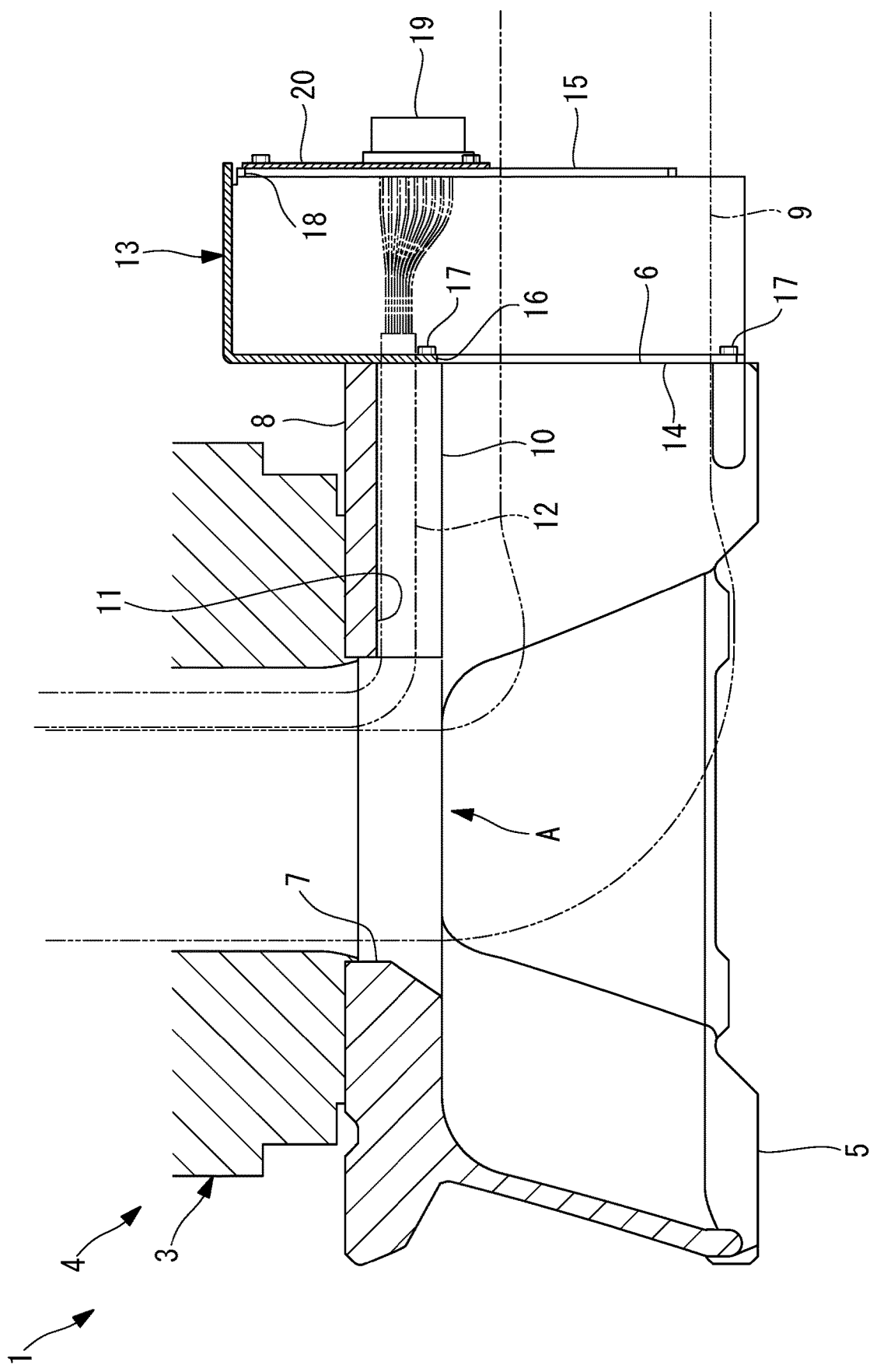
FIG. 5 is a longitudinal cross-sectional view showing a modification of the distribution board member of the robot in FIG. 2.

Although a case in which the distribution board member 13 has the inclined surface 21 between the attachment surface 14 and the relay surface 15 has been illustrated as an example in this embodiment, the inclined surface 21 need not be provided if the problem of interference or the like with the rotating drum 3, etc. does not occur. In this case, as shown in FIG. 5, the distribution board member 13 may be configured in a cuboid box shape.

By doing so, it is possible to facilitate production of the distribution board member 13 as a simpler shape.

Although the opening 18 of the relay surface 15 is provided in the distribution board member 13 in a form in which the opening 18 expands vertically upward with respect to the opening 16 of the attachment surface 14 in this embodiment, the form is not limited thereto. The opening 18 may be expanded to the left or right in the horizontal direction, or the opening 18 may be provided in a form in which the opening 18 expands vertically upward as well as in the horizontal direction. As an alternative method of securing a space in which the connector 19 can be mounted, a method of expanding the width of the base 2 is not suitable because the grounding surface of the robot 1 needs to be expanded; however, by using the distribution board member 13, it is not necessary to expand the width of the base 2.

Although a case in which the attachment surface 14 and the relay surface 15 of the distribution board member 13 are parallel to each other has been illustrated as an example in this embodiment, the attachment surface 14 and the relay surface 15 may be arranged at an angle to each other.

The groove 11 provided on the lower surface of the top plate 8 of the base 2 need not be provided if it is possible to secure, in the opening portion 10, a space through which the relayed wire members 12 are made to pass.

As a result, the following aspect is derived from the above-described embodiment.

An aspect of the present invention is a robot including: a base that is installed on the floor; and a movable portion including a rotating drum that is supported so as to be rotatable about a vertical axis with respect to the base, wherein the base is provided with an opening portion through which wire members are led into the base from the outside thereof, wherein the base and the rotating drum are provided with, at a position including the axis, a hollow portion in which the wire members that have been led into the base are guided into the rotating drum along the axis, wherein the robot further comprises a distribution board member that is detachably attached to the base, in the vicinity of the opening portion, wherein the distribution board member is provided with an attachment portion that is attached to the base, and a relay portion that is disposed on the outside of the opening portion with a gap therebetween when the attachment portion is attached to the base, and wherein the relay portion includes a mountable region having a larger area than the opening portion and in which a connector that relays at least some of the wire members can be mounted.

With this aspect, the wire members leading to the interior of the robot from the outside of the robot enter the opening portion of the base via the relay portion of the distribution board member that is attached to the base by means of the attachment portion, and are guided into the rotating drum along the vertical axis, from inside the base through the hollow portion provided in the base and the rotating drum. Because the hollow portion is formed at the position including the axis, the wire members passing through the hollow portion are not subjected to a large load even when the rotating drum rotates with respect to the base, and it is possible to maintain the wire members in a durable and sound state.

In this case, some of the wire members are relayed by the connector at the relay portion. With this aspect, even if it becomes impossible to secure a sufficient area, at the opening portion, for mounting the connector by reducing the height of the base, because the mountable region having a larger area than the opening portion is secured at the relay portion that is disposed on the outside of the opening portion with a gap therebetween, it is possible to mount the connector on the relay portion. By doing so, it is possible to secure a sufficient motion range for the robot and to achieve size reduction by reducing the total height of the robot while securing a space required for mounting the connector.

In the abovementioned aspect, the distribution board member may be formed in a box shape; the attachment portion may be formed on one surface of the distribution board member, and may be provided with an opening that is disposed at a position coincident with the opening portion and one or more attachment holes for fixing, in the periphery of the opening, the attachment portion to the base; and the relay portion may be formed on another surface of the distribution board member, said surface facing the aforementioned one surface, and in a state in which the attachment portion is attached to the base, the mountable region may be disposed in a state in which the mountable region expands with respect to the opening portion in at least one of a vertical direction and a horizontal direction.

With this configuration, it is possible to attach the box-shaped distribution board member to the base by aligning the opening of the attachment portion with the opening portion of the base and utilizing the attachment holes provided in the periphery of the opening. By aligning the opening of the attachment portion with the opening portion of the base, it is possible to attach the distribution board member without reducing the area of the opening portion. In this state, the mountable region of the relay portion is disposed in a state in which the mountable region expands with respect to the opening portion in at least one of the vertical direction and the horizontal direction, whereby the area of the mountable region becomes larger than the area of the opening portion by an amount equal to the area of the expanded portion, and it is possible to secure a space required for mounting the connector.

In the abovementioned aspect, the distribution board member may be provided with an inclined surface that is inclined in a direction in which the distribution board member gradually widens from the attachment portion toward the relay portion.

With this configuration, the inclined surface makes it possible to minimize the space occupied by the box-shaped distribution board member. In other words, because the distribution board member fixed to the base is disposed at a position close to the rotating drum that is rotatably supported by the base, by providing the inclined surface that is inclined in a direction in which the distribution board member is tapered from the relay portion toward the base, it is possible to reduce unnecessary projection and to secure a large distance from the rotating drum.

In the abovementioned aspect, the distribution board member may be formed in a cuboid box shape.

With this configuration, it is possible to configure the distribution board member in a simple manner.

In the abovementioned aspect, the relay portion may have, in a region of the mountable region other than a region in which the connector is mounted, a penetration opening that allows other wire members to pass therethrough without being relayed.

With this configuration, for example, in a case in which wire members are to be guided to a tool attached at the distal end of the robot and it is preferable that said wire members be guided to the tool without being relayed, the wire members can be made to pass through the penetration opening and the opening portion of the base from the outside of the base and can be directly led into the base.

In the abovementioned aspect, the base may be provided with a groove having a shape from which a portion of a peripheral edge of the opening portion is cut out, the peripheral edge being disposed in a direction in which the relay portion expands; and the groove may be capable of accommodating the wire members that are relayed by the relay portion.

With this configuration, by fixing the connector to the relay portion on the side expanded with respect to the opening portion, it is possible to accommodate, in the groove, the wire members that are wired into the base from the connector and to secure a large space for other wire members and wiring work therefor.

REFERENCE SIGNS LIST

1 robot
2 base
3 rotating drum
4 movable portion
9, 12 wire member
10 opening portion
11 groove
13 distribution board member
14 attachment surface (attachment portion)
15 relay surface (relay portion)
16 opening
18 opening (mountable region, penetration opening)
19 connector
21 inclined surface
A hollow portion

The invention claimed is:

1. A robot comprising:

a base that is installed on a floor; and a movable portion including a rotating drum that is supported so as to be rotatable about a vertical axis with respect to the base, wherein the base and the rotating drum comprises, at a position including the axis, a hollow portion through which wire bundle passes along the axis, wherein the base comprises a first opening that opens the hollow portion to outside the base, wherein the robot further comprises a distribution board housing that is detachably attached to the base, in the vicinity of the first opening, wherein the distribution board housing comprises an attachment surface attachable to the base, and a relay surface provided opposite the attachment surface by a gap therebetween, wherein the attachment surface comprises a second opening provided at a position corresponding to the first opening, wherein the relay surface comprises a third opening with a larger area than that of the first opening and that of the second opening, and wherein a connector for connecting the wire bundle is disposed by closing a portion of the third opening.

2. The robot according to claim 1, wherein:

the distribution board housing is formed in a box shape;

the attachment surface comprises one or more attachment holes for fixing, in the periphery of the second opening, the attachment surface to the base; and the third opening is disposed in a state in which the third opening expands with respect to the first opening in at least one of a vertical direction and a horizontal direction.

3. The robot according to claim 2, wherein the distribution board housing comprises an inclined surface that is inclined in a direction in which the distribution board housing gradually widens from the attachment surface toward the relay surface.

4. The robot according to claim 2, wherein the distribution board housing is formed in a cuboid box shape.

5. The robot according to claim 1, wherein: the wire bundle comprises a first wire bundle and a second wire bundle;

the first wire bundle passes through the hollow portion from outside the robot via a portion of the third opening at which the connector is not disposed, the first opening and the second opening; and the second wire bundle is connected to the connector and passes through the hollow portion via the first opening and second opening.

6. The robot according to claim 5, wherein:

the base comprises a groove having a shape from which a portion of a peripheral edge of the first opening is cut out, the peripheral edge being disposed in a direction in which the relay surface expands; and the groove is capable of accommodating the second wire bundle.

7. The robot according to claim 6, wherein the direction in which the relay surface expands is perpendicular to the vertical axis.

8. The robot according to claim 5, wherein the first wire bundle comprises wiring for a tool affixed to a distal end of the robot, and the second wire bundle comprises wiring for motors of the robot.

9. The robot according to claim 1, wherein the attachment surface and the relay surface are parallel-planar with one another.

* * * * *